United States Patent
Ramalingam et al.

(10) Patent No.: US 9,794,114 B2
(45) Date of Patent: *Oct. 17, 2017

(54) PREVENTING OR REDUCING TRAFFIC LOSSES

(71) Applicant: DELL PRODUCTS L.P., Round Rock, TX (US)

(72) Inventors: Purushothaman Ramalingam, Chennai (IN); Palanisamy Subramanian, Chennai (IN); Aravind Prasad Sridharan, Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 425 days.

This patent is subject to a terminal disclaimer.

(21) Appl. No.: 14/529,658

(22) Filed: Oct. 31, 2014

(65) Prior Publication Data

US 2016/0127168 A1   May 5, 2016

(51) Int. Cl.
*H04L 12/28* (2006.01)
*H04L 12/24* (2006.01)
*H04L 12/715* (2013.01)
*H04L 12/751* (2013.01)

(52) U.S. Cl.
CPC .......... *H04L 41/0654* (2013.01); *H04L 45/02* (2013.01); *H04L 45/46* (2013.01)

(58) Field of Classification Search
CPC ...... H04L 41/0654; H04L 45/02; H04L 45/46
See application file for complete search history.

(56) References Cited

U.S. PATENT DOCUMENTS

| 6,625,659 | B1* | 9/2003 | Aramizu | H04L 45/02 709/221 |
| 9,455,920 | B2* | 9/2016 | Gopalarathnam | H04L 47/17 |
| 2003/0231633 | A1* | 12/2003 | Aramizu | H04L 45/28 370/395.31 |
| 2004/0090913 | A1* | 5/2004 | Scudder | H04L 45/02 370/219 |

* cited by examiner

*Primary Examiner* — Charles C Jiang
*Assistant Examiner* — Ryan Kavleski
(74) *Attorney, Agent, or Firm* — North Weber & Baugh LLP

(57) ABSTRACT

Embodiments of the present invention include systems and methods for preventing or reducing traffic losses of data. If an information handling system, such as a switch or router, in a network attempts to install route information in the data store of the information handling system and has a failure or a potential failure, the information handling system may take one of several options or combinations thereof. In embodiments, the information handling system may not advertise the route information. In embodiments, the information handling system may send a route withdrawal message to one or more peer information handling systems to remove that system from routing determinations involving the route information. Alternatively, the information handling system may advertise the route prefix with a high metric to indicate that the system is a non-preferred forwarder for data intended for a destination associated with the route information.

20 Claims, 7 Drawing Sheets

PREVENTING OR REDUCING TRAFFIC LOSSES

A. TECHNICAL FIELD

The present invention relates to mitigation of impact due to a failure or potential failures in a network device during network communication, more particularly, to systems and methods for avoiding or reducing traffic losses due to a failure or potential failure in an information handling system.

B. DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Data traffic is communicated using various protocols. Consider the Border Gateway Protocol (BGP). The BGP protocol is a widely-used Internet Protocol and is also used in various data centers. BGP finds the best route for a given destination and programs the best route into hardware memory, such as a Content-Addressable Memory (CAM) table. There are possibilities that a hardware write failure may happen, and hence the route cannot be added in hardware, which leads traffic loss. A network system may lose data packets due to various failures, such as hash collision, CAM full, hardware failure, etc. CAM full may occur when a routing table does not have enough memory space to store an additional route entry therein, while hash collisions may occur even when the routing table has enough memory space.

FIG. 1 shows a schematic diagram of a conventional network 100. As depicted, one or more devices (e.g., Host 1 130) on the left hand side of the Router A 105 communicates data via a network having five routers, Routers A-E 105-125. For the purpose of illustration, it is assumed that the Router A 105 receives information of route prefix a.b.c.d/n 135 that is located on the left hand side of the router A 105. Route information (e.g., route prefix a.b.c.d/n 135) is learned in Router A 105, and using BGP, it will try to install this route in its hardware table and advertise this route to its peers. That is, typically, each router gets reachability information (or, equivalently, control packet information) from a neighboring router or routers. For instance, Router B 110 and Router E 125 receive reachability information from Router A 105, wherein the reachability information may include the route prefix a.b.c.d/n 135. After receiving the route information from its peer, Router E 125 and Router B 110 each updates its hardware and sends the route update to its peers. Thus, Router C 115 and Router D 120 obtain reachability information from Router B 110 and Router E 125 (respectively). In general, each of the routers in FIG. 1 uses a routing protocol that shares the reachability information among immediate neighbors first and then, the reachability information is disseminated throughout the entire network 100.

When the routers gain knowledge of the topology of the network 100, a routing algorithm determines a specific choice of route. For instance, assuming that each path between two adjacent routers has the same metrics, the shortest path first (SPF) calculation performed by the routing algorithm will show a shortest path to send a data packet.

Now consider a hardware entry write for the route 135 failed in Router E 125 due to CAM table full. Upon receiving the update from Router B 110, Router C 115 will program its hardware and send the update to Router D 120. Router D 120 will calculate the best path for the route from the route information received from its peers (Router C 115 & Router E 125). Now, consider the best path algorithm has chosen Router E 125 as the next hop to reach the route a.b.c.d/n and installed it in its hardware table.

Since Router D 120 is not aware of the failure in Router E 125, Router D will send data packets intended for route a.b.c.d/n to Router E. However, since Router E does not have the a.b.c.d/n 135 in its route table due to the write failure, it cannot route the data packets and the data packets will be dropped.

Accordingly, what is need are systems and methods for avoiding or mitigating traffic loss due to such failures.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
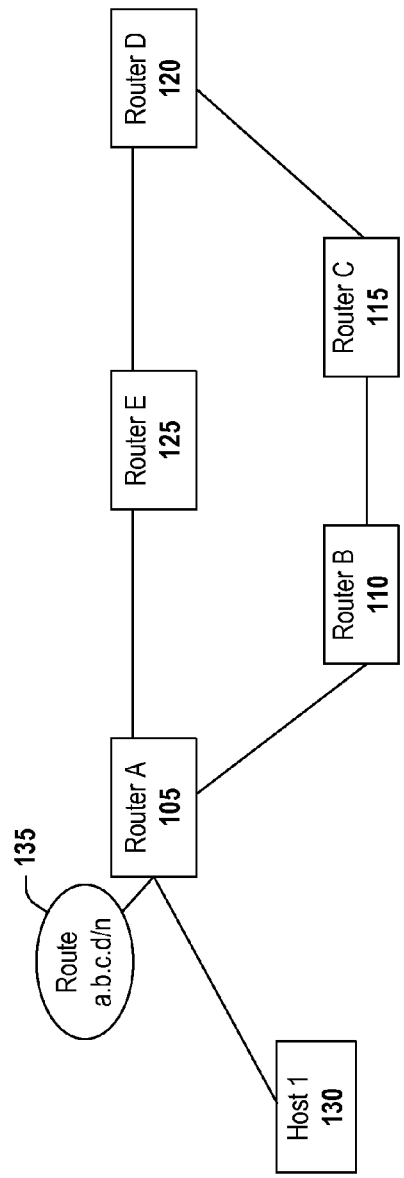
FIG. 1 shows a schematic diagram of an internetwork of information handling systems.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or nodes, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components or nodes may be implemented in software, hardware, or a combination thereof.

Furthermore, connections between components/routers/switches within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

For purposes of illustration, assume that a router receives route information, such as a route destination or route prefix a.b.c.d/n. The router, or an agent or application operating on the router, may advertise control packet information (or, reachability information) to neighboring routers using a routing protocol, such as Border Gateway Protocol (BGP). The control packet information may include data indicating that a specific network is reachable, and what the next hop or IP address is to use to get to the final destination.

When a router gains knowledge of the topology of a network, a routing algorithm of the router determines a specific choice of route for data transmission related to that route information. For instance, assuming that each path between two adjacent routers has the same metrics and none of the routers have a failure, the shortest path first (SPF) calculation performed by the routing algorithm of a router will show the shortest/optimal path to send data packets. Thus, in embodiments, a BGP agent on the router finds the best route for the given destination and programs or installs this best route into memory in the router. However, failures can occur; hence, the route may not be added in hardware memory, which leads to traffic loss. A router can have various types of route installation failures, such as hardware failure, hash collision, and CAM full, etc.

A. Route Withdrawal-Related Embodiments

Figure 2:
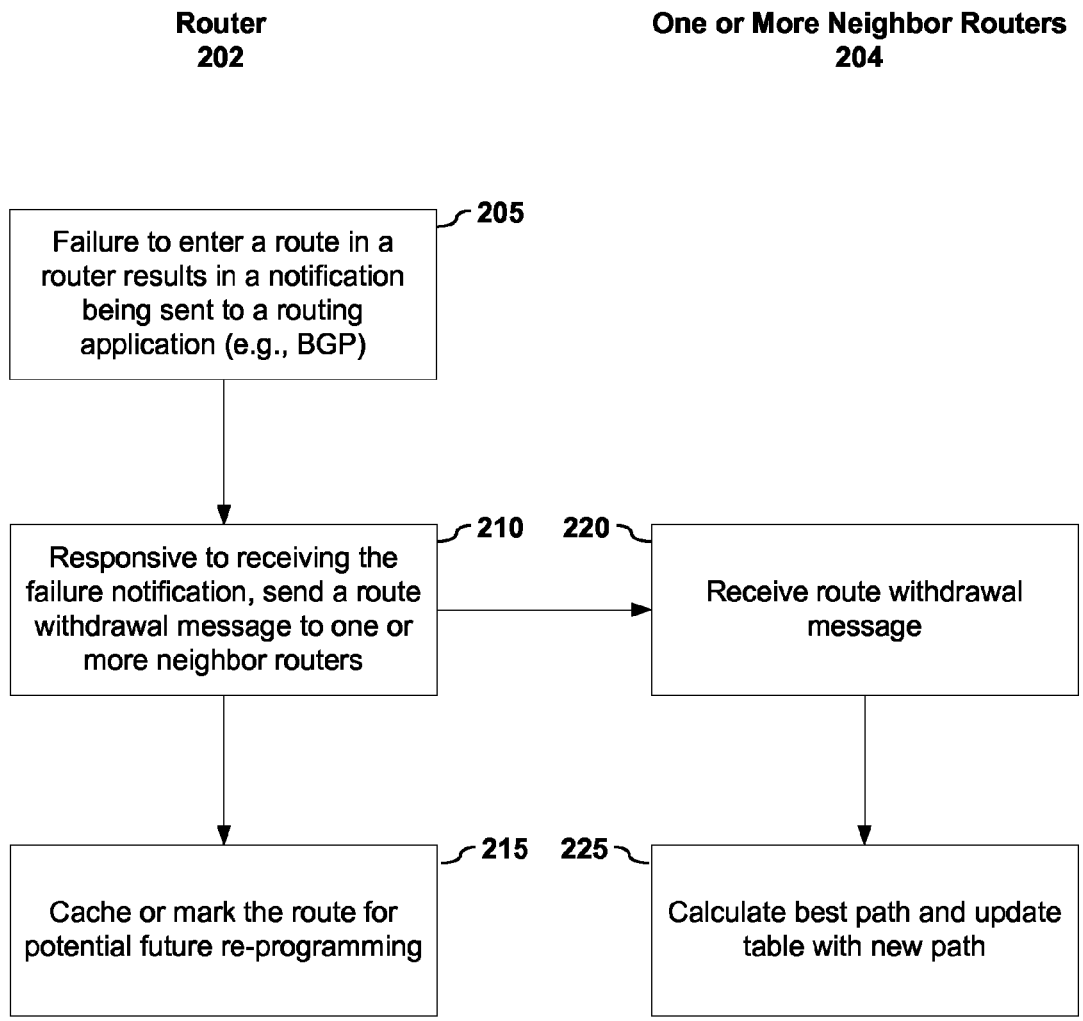
FIG. 2 shows a flowchart of an exemplary process for reducing or preventing data traffic loss due to route installation failures according to embodiments of the present invention.

FIG. 2 shows a flowchart of an exemplary process for reducing or preventing data traffic loss due to route installation failures according to embodiments of the present invention. In embodiments, when the entry write of route information fails, an indication may be sent (205) to a routing application (e.g., a BGP application) operating on the router. When the failure notification is received, a route withdrawal message for the specific route is sent (210) to the router's neighbors to whom it had already advertised this route.

Consider, for purposes of illustration, the network in FIG. 1. Assume that Router E 125 has had a write failure due to the CAM table being full but has already advertised the route to its peer router(s) (e.g., Router D 120). Upon receiving the failure notification, Router E 125 sends a route withdrawal message for the specific route to Router D 120.

In embodiments, after receiving (220) the withdrawal message from Router E 125, Router D 120 updates (225) its routing data by recalculating and storing an updated best path. In this example, Router D 120 calculates the best path for the route to have Router C 115 as its next hop.

Under the prior approach, data traffic for the destination a.b.c.d/n entering through Router D 120 would normally have been sent to Router E 125 since this the best route according to Router D because Router D does not know that there was a failure in Router E. But, since the memory write for the route a.b.c.d/n failed in Router E 125 due to the CAM table being full, the traffic from Router D to the destination a.b.c.d/n would have been dropped. However, under the methodology depicted in FIG. 2, the traffic will be forwarded to Router C 115 and then on to the destination.

Figure 3:
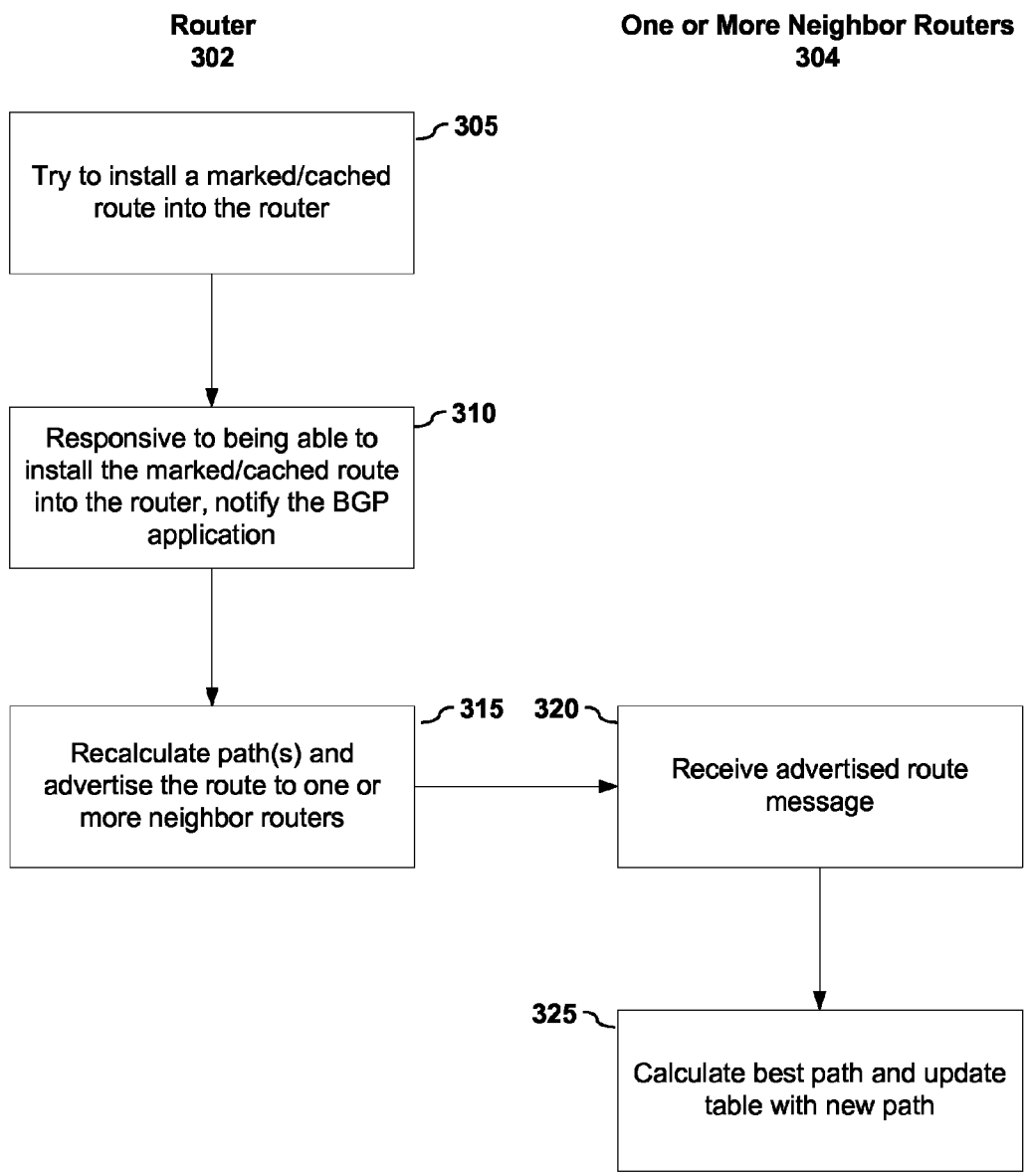
FIG. 3 depicts a flowchart of an exemplary process for improving data traffic routing according to embodiments of the present invention.

Turning now to FIG. 3, depicted is a flowchart of an exemplary process for improving data traffic routing after a failure has occurred according to embodiments of the present invention. In embodiments, a router that had a failure caches or otherwise marks (see Step 215 in FIG. 2) that the specific route as having failed. The router may then try (305) on one or more occasions to install or write the route into its memory. In embodiments, responsive to being able to install the route into the router' memory, the routing protocol application (e.g., a BGP application) on the router is notified (310). In embodiments, the routing protocol application recalculates (315) a routing path for data associated with that route and advertises the route to one or more neighbor routers. When a neighboring router receives (320) the advertised route message, it processes it as normally done; namely, it updates the route path(s) as necessary and writes (325) the route to its memory.

For example (continuing with the scenario used above in which Router E has had a route write failure), the BGP application in Router E caches or marks the specific route which had a write failure. When the BGP application is able to successfully re-program the CAM using the route information, and re-advertises the route. Reprogramming of hardware (memory) when the router is able to do so and advertising the route to the peer is helpful in this case, as the path via Router E 125 is the best, preferred path compare to other paths for that destination. If the system did not reprogram and update when it is able to properly write the route information to memory, Router D would be using the old path (via Router C), which may not be as good as the new path (via Router E).

It shall be noted that the same or similar solutions are applicable to Equal-Cost Multi-Path routing (ECMP) cases as well. In ECMP cases, the route withdrawal notification due to failure to the peer will trigger the peer to select an alternate path. It should also be noted that embodiments of the present invention provide other advantages. For example, embodiments of the present invention are relatively straightforward and local node specific. Traffic lose may be avoided without any major change in protocols (e.g., BGP protocol). Also, there is no interoperability issue for routers that receive the withdrawal messages (e.g., Router D may be any vendor's equipment).

B. Threshold Level Embodiments

Figure 4:
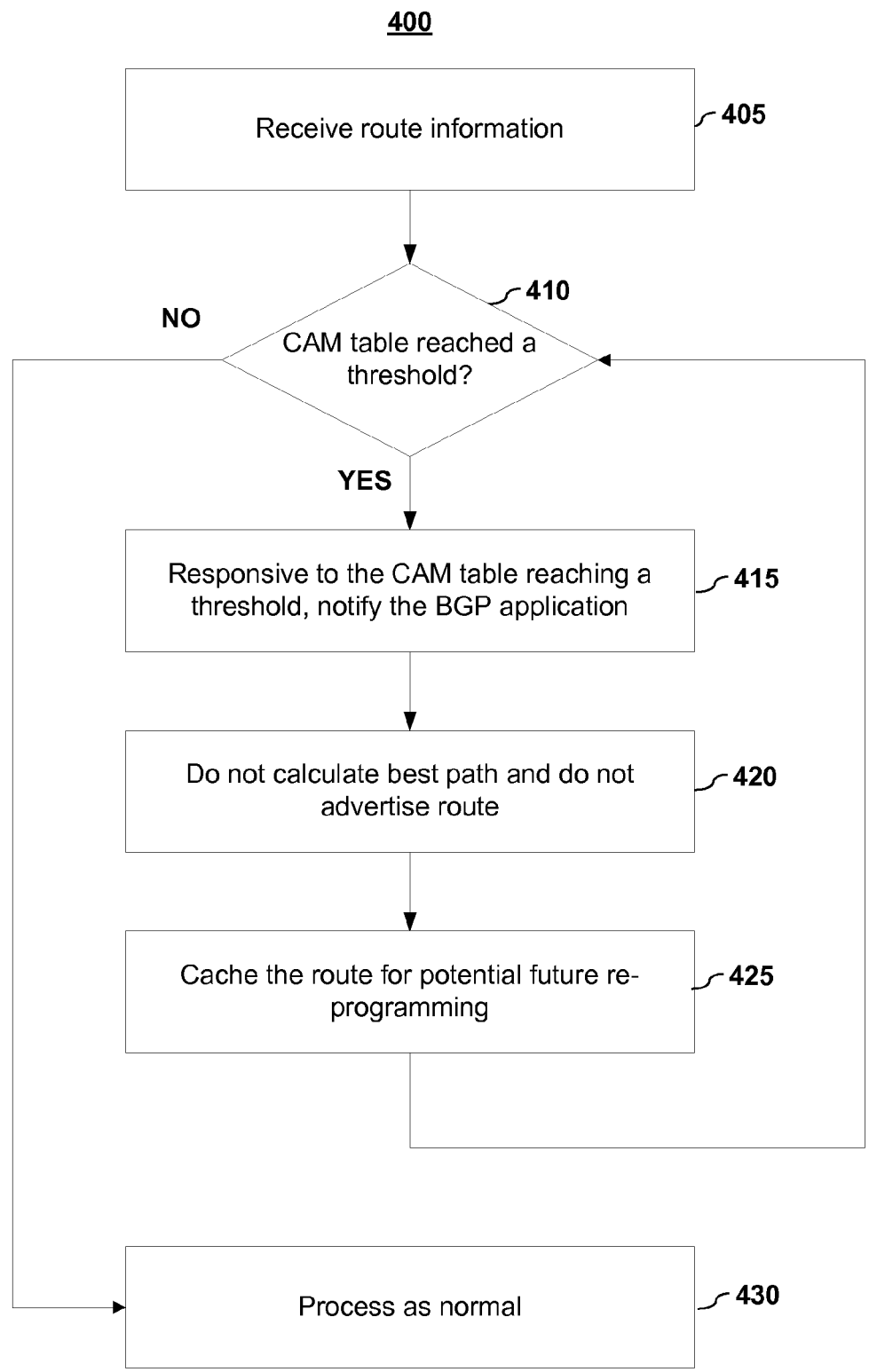
FIG. 4 shows a flowchart of an exemplary process for reducing or preventing data traffic loss due to route installation failures or potential failures according to embodiments of the present invention.

FIG. 4 shows a flowchart of an exemplary process for reducing data traffic loss due to route installation failures or potential failures according to embodiments of the present invention. A router receives (405) route information. In embodiments, to reduce the risk of traffic loss due to route installation failures or potential failures (such as when there is CAM space issues), when the CAM space reaches (410) a threshold level (e.g., above/below a certain threshold), an indication may be sent (415) to a routing protocol application. In embodiments, the threshold level may be when there are fewer than a set number of spaces left in the CAM table. In embodiments, the threshold level may be when there are only 3 or 4 entry spaces left in the CAM table, although other numbers or thresholds may be used.

Upon receiving the indication, in embodiments, the router does not consider (420) the route for best path calculation and hence the route will not be advertised to the peer. It should be noted that by not performing these operations, unnecessary router processing and data traffic is reduced. In embodiments, the router caches or otherwise marks (425) the route information in its memory for potential future attempts to install the route information for use.

If the route information is successful installed whether initially or during a subsequent attempt, the route information may be processed (430) as normally done. For example, in embodiments, a routing protocol application of the router will consider the route for best path calculation (only if the cached threshold value is not reached some marker value) so that hardware failure will not cause any traffic impact. Then, in embodiments, the route advertisement will happen after the best path calculation.

One skilled in the art shall recognize that by not advertising the route this approach forces a peer router to choose an alternate path. Consider, by way of illustration, the network of FIG. 1. According to embodiments of the present invention, Router D would not receive any update from Router E, if the CAM space in Router E reached a threshold value. Hence, Router D will choose Router C as the next hop to reach the network a.b.c.d/n.

In embodiments, the BGP agent in Router E may cache/mark the routes in its database to indicate that a best path calculation had not happened because a potential failure threshold level was triggered. This cache helps the BGP application to re-program the router's route hardware (memory) when the hardware/CAM space no longer triggers a threshold value. Once installed in Router E, it can advertise the route to its peers so that they can select an optimal path to the destination. Reprogramming of memory when the BGP agent finds free space in CAM and advertising the route to the peer can be helpful in the event that this path (e.g., from Router E) is the best preferred path compare to other paths. Also, as noted above, one of the advantages of this approach compared to the previous approach is that there is no need to send unnecessary update messages (when the hardware/CAM space reached the threshold) to the peer.

It shall be noted that these approaches also work when there is a failure or potential failure in the Route Table Manager (RTM). A RTM will have a number of active routes. In embodiments, once the number of active route counts reaches a threshold value (e.g., 16000 but other numbers may be selected and used), it can provide notification that the hardware entry is full or nearly full. By this way, a Layer 3 (L3) protocol will be able to detect this and can react quickly. By this approach, hardware interaction for L3 protocols may be avoided for the situation like a CAM table being full.

C. Additional Alternative Embodiments

As previously noted, scenarios such as when the CAM table is full, hash collisions, and the like, typically lead to installation failures of certain routes. Since the protocols are completely unaware of such failures, they continue to advertise such routes, which may lead to potential black holes in routing. As discussed above, embodiments to address these issues include avoiding the advertising of the route via the protocol or by sending route withdrawals for routes which cannot be installed in CAM and have been advertised.

But, it should be noted that such approaches may not be directly possible in link state protocols since the link state database should be consistent among all the routers in domain. Accordingly, aspects of the present invention include embodiments in which the route may be advertised but set with a use metric that makes that route via that router a non-preferred (a less or even least preferred) option. It should be noted that this approach may be used for both Interior Gateway Protocols (IGPs)/link state protocols like Intermediate System to Intermediate System (ISIS) and Open Shortest Path First (OSPF) and for distance vector protocols like Border Gateway Protocol (BGP) and Exterior Gateway Protocol (EGP).

Figure 5:
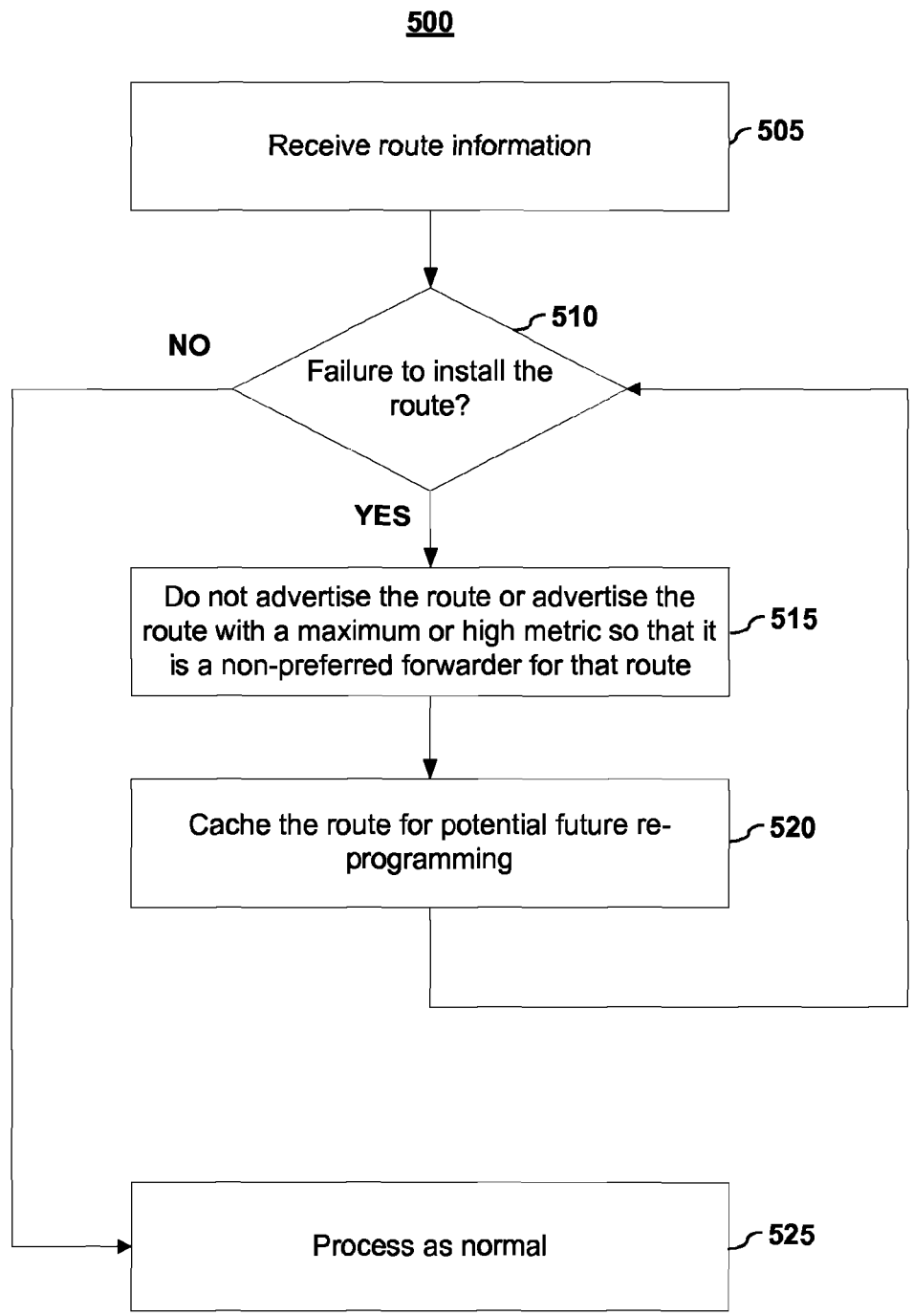
FIG. 5 shows a schematic diagram of an internetwork of information handling systems according to embodiments of the present invention.

FIG. 5 presents an exemplary approach for reducing or preventing data traffic loss due to route installation failures or potential failures according to embodiments of the present invention. As illustrated, a router receives (505) route information. In embodiments, to reduce the risk of traffic loss due to failures to install (510) the route information, an indication may be sent (not shown) to an application. For example, in embodiments, the Route Table Manager (RTM)/Forwarding Information Base (FIB) notifies the respective protocol or protocols that contributed the routes about the installation failure along with information of uninstalled routes. Upon receiving the indication, in embodiments, the router may not advertise the route or may advertise (515) the route with a metric (e.g., a maximum metric) via a protocol to one or more peers so that the router would be a least preferred forwarder for that route. Thus, other routers are encouraged to use other possible available paths to route the related traffic whenever possible.

In embodiments, the router may cache (520) the route for potential re-installation into the router's routing table memory. If the route information is successfully installed whether initially or during a subsequent attempt, the route information may be processed (525) as normally done. For example, embodiments, in embodiments, a BGP application of the router will consider the route for best path calculation so that failure will not cause any traffic impact.

Figure 6:
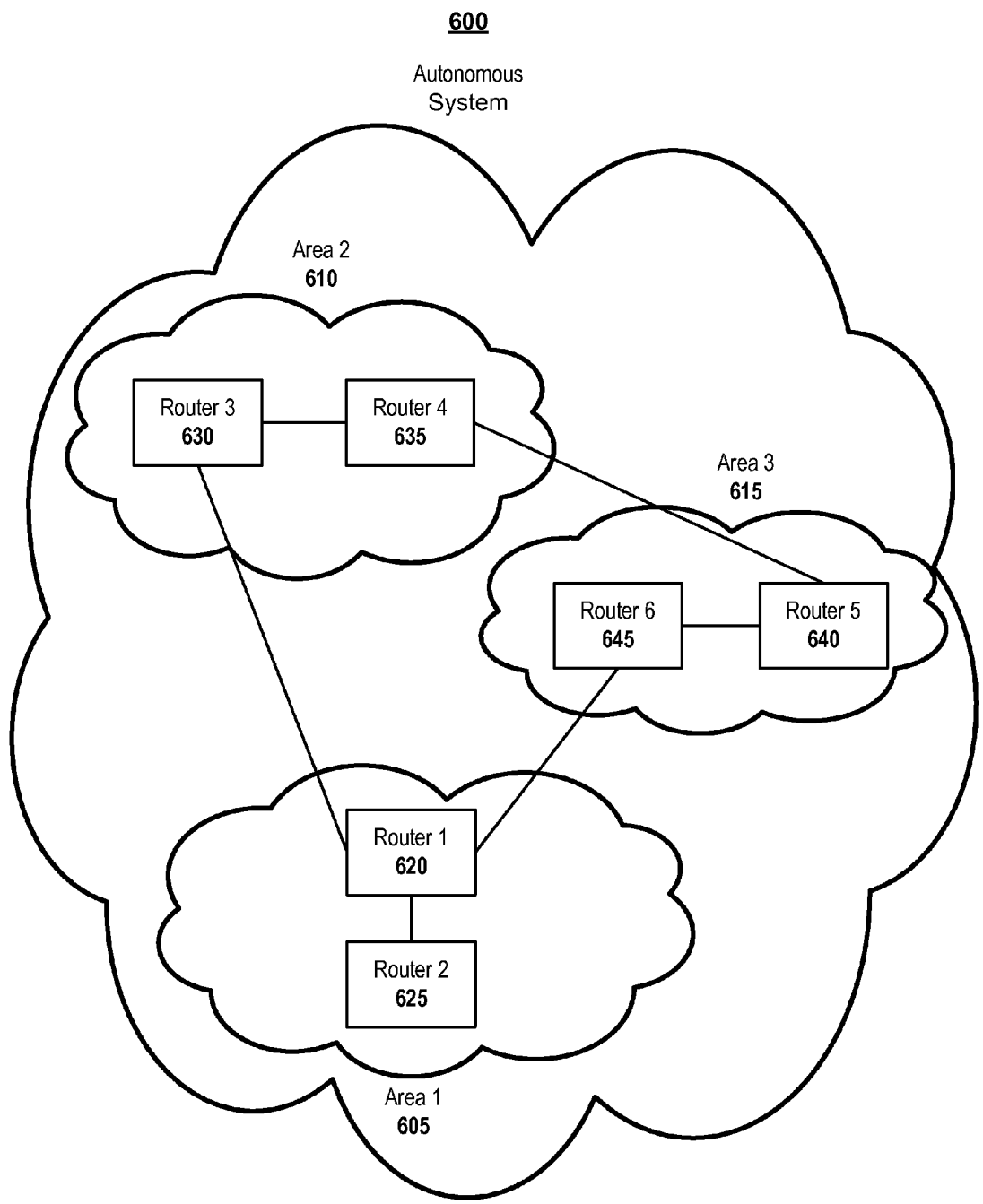
FIG. 6 shows a flowchart of another exemplary process for reducing or preventing data traffic loss due to route installation failures or potential failures according to embodiments of the present invention.

Consider, by way of illustration, the network system 600 disclosed in FIG. 6. FIG. 6 depicts an autonomous network system 600 comprising three areas (Area 1 605, Area 2 610, and Area 3 615) according to embodiments of the present invention. In the depicted example, the border routers for the areas are as follows: Area 1—Router 1 (620); Area 2—Router 3 (630) and Router 4 (635); and Area 3—Router 5 (640) and Router 6 (645). Usually, the border routers are the ones that populate the IP prefixes from other areas into their area and the prefixes internal to their area to other areas. Hence, in general, the border routers are the routers responsible for leaking/populating the reachability information between areas.

For Interior Gateway Protocols (e.g., ISIS and OSPF), the link state database should be consistent within particular Levels or Areas. Whenever the routes are leaked between Levels (in case of ISIS) and between Areas (in case of OSPF), in embodiments, routes may be either leaked with a high or maximum metric or not leaked at all. That is, in embodiments, for the route or routes that are not installed in a router, whenever route-leaking and/or redistribution of the route or routes are done, the router could avoid advertising the route(s) via the protocol or could advertise the route(s) with a maximum metric via the protocol to peers so that the router would be a less or least preferred forwarder for that route or routes.

Consider, by way of illustration, that Router 1 620 undergoes a route installation failure. Thus, for peer border routers (e.g., Router 3 630 and Router 6 645) or for routers within the same area (e.g., Router 2 625), during route redistribution or route leaking, Router 1 may not advertise the route information or may advertise the route information with a metric that makes Router 1 a non-preferred option. It should be noted that these implementations are applicable at the border routers. Because, in the case of IGPs (e.g., ISIS and OSPF), the link state database should be consistent across all routers in the same area/level.

Also, in embodiments, in the case of ISIS, route-leaking may be done between the level-1 and level-2 databases in the same router. Hence, whenever such types of route-leakings are done, the above-mentioned implementations may be followed.

For distance vector protocols (e.g., BGP), in case of failures in installing routes to the CAM table, in embodiments, route withdrawal messages may be sent for those specific routes to the BGP peers thereby avoiding possible black holes. Also, in embodiments, during redistribution of routes to other protocols, the uninstalled routes in the CAM may be prevented from being redistributed. Alternatively, the route may be sent with a metric that indicates that the router is a non-preferred option, as previously discussed.

Further, in embodiments, whenever the CAM becomes available again, the protocols may be informed correspondingly by either the RTM or FIB. And, in embodiments, the notifications may be done sequentially depending upon the available free space in the CAM.

It should be noted that the above-discussed embodiments may include or be combined with aspects of other embodiments previously discussed. For example, it may be preferred that the system detect the possibility of failure scenarios like CAM "FULL" states and notify the protocol(s) correspondingly, instead of postponing the notifications until such failures occurred. Thus, at the FIB or RTM, the router monitors the available CAM space. Hence, whenever the CAM gets filled to a particular threshold value (e.g., 95% full), the router system may initiate a "CAM FULL" message notification to one or more protocols. Upon receiving the message, the protocol(s) may stop pushing new routes to RTM for installation in CAM and could either advertise the new routes with maximum metric, not advertise the route, or initiate route withdraws (if required).

D. Information Handling System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 7:
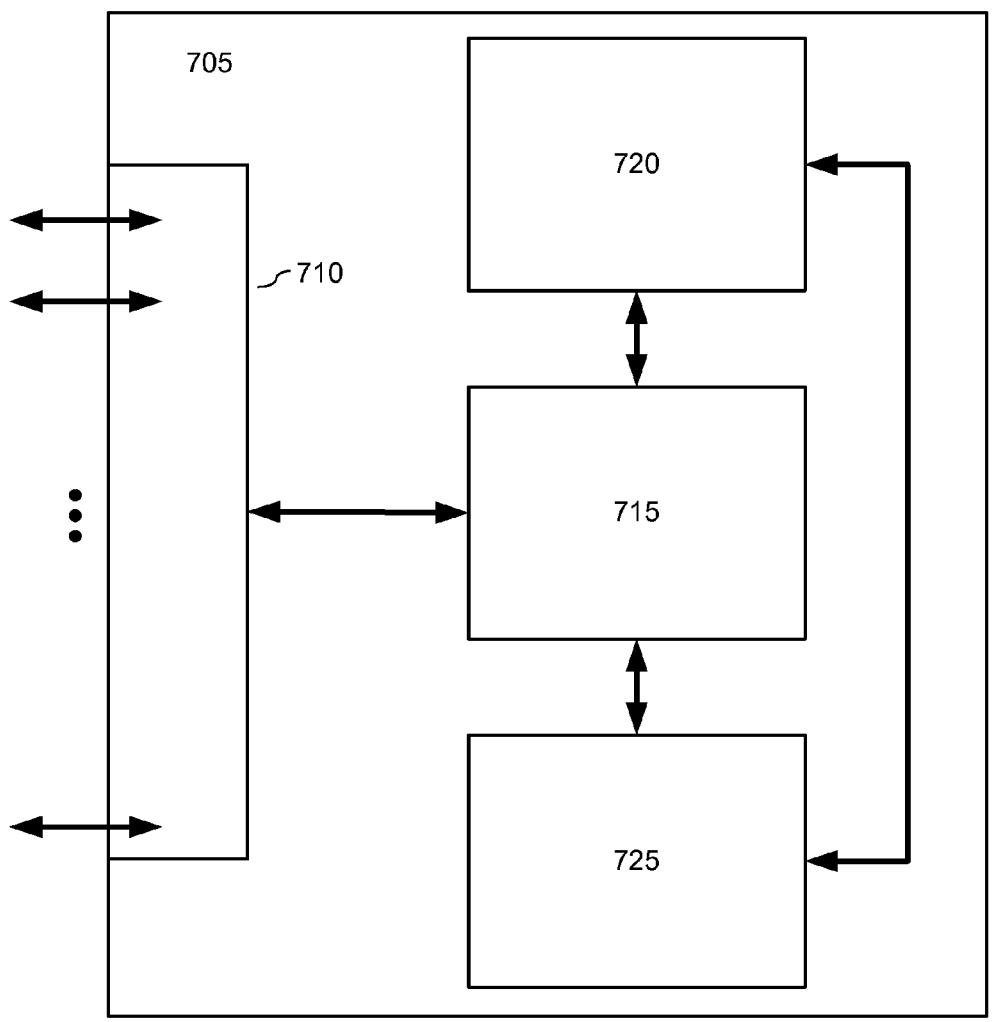
FIG. 7 shows a simplified block diagram of an information handling system according to embodiments of the present invention.

FIG. 7 depicts a simplified block diagram of an information handling system 700 according to embodiments of the present invention. It will be understood that the functionalities shown for device 705 may operate to support various embodiments of an information handling system (or node)—although it shall be understood that an information handling system may be differently configured and include different components. The information handling system 705 may include a plurality of I/O ports 710, a network processing unit (NPU) 715, one or more tables 720, and a central processing unit (CPU) 725. The system includes a power supply (not shown) and may also include other components, which are not shown for sake of simplicity.

In embodiments, the I/O ports 710 may be connected via one or more cables to one or more other network devices or clients. The network processing unit (NPU) 715 may use information included in the network data received at the node 705, as well as information stored in the tables 720, to identify a next hop for the network data, among other possible activities. In embodiments, a switching fabric then schedules the network data for propagation through the node to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An information handling system for preventing or reducing traffic loss of data, the information handling system comprising:
   a plurality of ports for facilitating the switching or routing of data to and/or from one or more peer information handling systems communicatively coupled to the information handling system;
   one or more processors that are communicatively coupled to the plurality of ports;
   a data store, communicatively coupled to the one or more processors, for recording routing information; and
   a non-transitory memory comprising one or more sequences of instructions which, when executed by the one or more processors, causes steps to be performed comprising:
      receiving route-related information at the information handling system;
      responsive to failing to install the route-related information into the data store in the information handling system, sending a fail indicator to a routing application on the information handling system that is configured to exchange routing information between systems; and
      responsive to the routing application receiving the fail indicator, sending a route withdrawal message to one or more peer information handling systems to remove the information handling system from routing determinations involving the route-related information.

2. The information handling system of claim 1 wherein the route-related information comprises a route prefix associated with a destination.

3. The information handling system of claim 1 wherein the non-transitory memory further comprises one or more sequences of instructions which, when executed by the one or more processors, causes steps to be performed comprising:
   caching or marking the route-related information for future attempts to install the route-related information into the data store in the information handling system.

4. The information handling system of claim 3 wherein the non-transitory memory further comprises one or more sequences of instructions which, when executed by the one or more processors, causes steps to be performed comprising:
   responsive to installing the route-related information into the data store in the information handling system, performing the steps comprising:
      using the route-related information to calculate one or more routes involving a destination associated with the route-related information; and
      advertising the route information to one or more peer information handling systems communicatively coupled to the information handling system.

5. The information handling system of claim 3 wherein the non-transitory memory further comprises one or more sequences of instructions which, when executed by the one or more processors, causes steps to be performed comprising:
   determining at one or more times if the route-related information can be installed in the data store of the information handling system.

6. The information handling system of claim 4 wherein the step of advertising of the route-related information to one or more peer information handling systems communicatively coupled to the information handling system causes at least one of the one or more peer information handling systems to consider the information handling system when determining routing of a destination associated with the route-related information.

7. An information handling system for preventing or reducing traffic loss of data, the information handling system comprising:
   a plurality of ports for facilitating the switching or routing of data to and/or from one or more peer information handling systems communicatively coupled to the information handling system;
   one or more processors that are communicatively coupled to the plurality of ports;
   a data store, communicatively coupled to the one or more processors, for recording routing information; and
   a non-transitory memory comprising one or more sequences of instructions which, when executed by the one or more processors, causes steps to be performed comprising:
      receiving a route prefix; and
      responsive to failing to install routing information related to the route prefix into the data store in the information handling system, advertising the route prefix with a high metric to indicated that the information handling system is a non-preferred forwarder for data intended for a destination associated with the route prefix.

8. The information handling system of claim 7 wherein the step of failing to install routing information related to the route prefix into the data store in the information handling system further comprises:
determining that a table in the data store in which the route prefix is to be stored has reached a threshold level.

9. The information handling system of claim 7 wherein the table is a Content Addressable Memory (CAM) table.

10. The information handling system of claim 7 wherein the table is an active routes table maintained by a Routing Table Manager (RTM).

11. The information handling system of claim 8 wherein the non-transitory memory further comprises one or more sequences of instructions which, when executed by the one or more processors, causes steps to be performed comprising:
responsive to determining that the table in memory in which the route prefix is to be stored has reached a threshold level, not calculating one or more routing paths involving the route prefix.

12. The information handling system of claim 7 wherein the non-transitory memory further comprises one or more sequences of instructions which, when executed by the one or more processors, causes steps to be performed comprising:
caching or marking the route prefix for future attempts to store the route prefix into the data store in the information handling system.

13. The information handling system of claim 12 wherein the non-transitory memory further comprises one or more sequences of instructions which, when executed by the one or more processors, causes steps to be performed comprising:
responsive to installing the route prefix into the data store in the information handling system, performing the steps comprising:
using the route prefix to calculate a route involving a destination associated with the route-related information; and
advertising the route prefix to one or more peer information handling systems communicatively coupled to the information handling system.

14. The information handling system of claim 12 wherein the non-transitory memory further comprises one or more sequences of instructions which, when executed by the one or more processors, causes steps to be performed comprising:
determining at one or more times if the route prefix can be installed in the data store of the information handling system.

15. An information handling system for preventing or reducing traffic loss of data, the information handling system comprising:
a plurality of ports for facilitating the switching or routing of data to and/or from one or more peer information handling systems communicatively coupled to the information handling system;
one or more processors that are communicatively coupled to the plurality of ports;
a data store, communicatively coupled to the one or more processors, for recording routing information; and
a non-transitory memory comprising one or more sequences of instructions which, when executed by the one or more processors, causes steps to be performed comprising:
receiving a route prefix; and
responsive to determining that a table in the data store in which the route prefix is to be stored has reached a threshold level, performing at least one of the steps comprising:
[a] advertising the route prefix with a high metric to indicated that the information handling system is a non-preferred forwarder for data intended for a destination associated with the route prefix; and
[b] sending a route withdrawal message to one or more peer information handling systems to remove the information handling system from routing determinations involving the route prefix.

16. The information handling system of claim 15 wherein the table is a Content Addressable Memory (CAM) table or is an active routes table maintained by a Routing Table Manager (RTM).

17. The information handling system of claim 15 wherein the non-transitory memory further comprises one or more sequences of instructions which, when executed by the one or more processors, causes steps to be performed comprising:
responsive to determining that the table in memory in which the route prefix is to be stored has reached a threshold level, not calculating one or more routing paths involving the route prefix.

18. The information handling system of claim 15 wherein the non-transitory memory further comprises one or more sequences of instructions which, when executed by the one or more processors, causes steps to be performed comprising:
caching or marking the route prefix for future attempts to store the route prefix into the data store in the information handling system.

19. The information handling system of claim 18 wherein the non-transitory memory further comprises one or more sequences of instructions which, when executed by the one or more processors, causes steps to be performed comprising:
determining at one or more times if the route prefix can be installed in the data store of the information handling system.

20. The information handling system of claim 18 wherein the non-transitory memory further comprises one or more sequences of instructions which, when executed by the one or more processors, causes steps to be performed comprising:
responsive to installing the route prefix into the data store in the information handling system, performing the steps comprising:
using the route prefix to calculate a route involving a destination associated with the route-related information; and
advertising the route prefix to one or more peer information handling systems communicatively coupled to the information handling system.

* * * * *